(12) United States Patent
Tanaka

(10) Patent No.: US 9,166,693 B2
(45) Date of Patent: Oct. 20, 2015

(54) OPTICAL TRANSCEIVER HAVING RESET SEQUENCE

(71) Applicant: SUMITOMO ELECTRIC INDUSTRIES, LTD., Osaka-shi, Osaka (JP)

(72) Inventor: Hiromi Tanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 188 days.

(21) Appl. No.: 13/680,672

(22) Filed: Nov. 19, 2012

(65) Prior Publication Data

US 2013/0132632 A1    May 23, 2013

(30) Foreign Application Priority Data

Nov. 22, 2011   (JP) ................................. 2011-255103

(51) Int. Cl.
*H04B 10/40*  (2013.01)
*G06F 9/44*  (2006.01)
*G06F 1/24*  (2006.01)

(52) U.S. Cl.
CPC *H04B 10/40* (2013.01); *G06F 1/24* (2013.01); *G06F 9/4401* (2013.01); *G06F 9/4416* (2013.01)

(58) Field of Classification Search
CPC ........ G06F 1/24; G06F 9/4401; G06F 9/4416
USPC ................................................ 710/305; 713/1
See application file for complete search history.

(56) References Cited

U.S. PATENT DOCUMENTS

| | | | |
|---|---|---|---|
| 6,052,746 A * | 4/2000 | Kalluri et al. ................... | 710/38 |
| 6,865,688 B2 * | 3/2005 | Dawkins et al. ............... | 714/6.1 |
| 7,346,764 B2 * | 3/2008 | Moriwaki et al. ................ | 713/1 |
| 7,487,434 B2 * | 2/2009 | Moriwaki et al. ............ | 714/799 |
| 2002/0176430 A1 * | 11/2002 | Sangha et al. ................ | 370/412 |

FOREIGN PATENT DOCUMENTS

| | | |
|---|---|---|
| JP | 2003-050647 A | 2/2003 |
| JP | 2006-101432 A | 4/2006 |
| JP | 2006-146461 A | 6/2006 |
| JP | 2008-113207 A | 5/2008 |

OTHER PUBLICATIONS

Office Action in the corresponding Japanese Patent Application No. 2011-255103 dated Aug. 18, 2015.

* cited by examiner

*Primary Examiner* — Brian Misiura
(74) *Attorney, Agent, or Firm* — Global IP Counselors, LLP

(57) ABSTRACT

An electronic apparatus is disclosed where the apparatus provides the I2C bus and enables to resume the I2C bus even after the apparatus receives external RESET independent of the status of the I2C communication. A circuit unit communicating with the controller by the I2C bus, which is necessary to be reset, is further coupled with the controller by an internal RESET. The controller, receiving the external RESET, first completes the communication on the I2C bus, then sends the internal RESET to the circuit unit, finally resets itself.

3 Claims, 6 Drawing Sheets

Fig. 2A

*Page Write*

| S | Slave Address | W | A | Memory Address | A | S | Slave Address | R | A | Data | Data | N | P |

Fig. 2B

*Random Read*

| S | Slave Address | W | A | Memory Address | A | Data | A | P |

OPTICAL TRANSCEIVER HAVING RESET SEQUENCE

BACKGROUND OF THE INVENTION

1. Field of the Invention

The present invention relates to control an optical transceiver, in particular, the invention relates to a reset sequence of the optical transceiver.

2. Related Prior Arts

One type of an optical transceiver has been known, where the optical transceiver has a plurality of circuit units and a controller to control the circuit units coupled with the circuit units by, what is called, the inter integrated circuit (hereafter called as I2C) bus, and an external system such as a host controller can communicate with both of the circuit units and the controller. The external system sometimes asserts RESET during the controller communicates with one of the circuit units through the I2C bus, especially, when the circuit unit sets SDA in LOW. In such a case, a status where SDA is set in LOW continues even after RESET is negated. In the I2C bus, setting SDA from HIGH to LOW during SCL is HIGH, which corresponds to START flag; the communication on the I2C bus can be started. Thus, when SDA continues the state LOW by the reason above described, the start flag is never set on the I2C bus, which means that the controller can not control the circuit units.

SUMMARY OF THE INVENTION

An aspect of the present application relates to an apparatus that communicates with an external system. The apparatus includes a controller and a circuit unit. The controller receives the external RESET from the external system. The circuit unit communicates with the controller via the I2C bus and the internal RESET but free from the external RESET. Receiving the external RESET, the controller first completes the communication on the I2C bus, then, sends the internal RESET to the circuit unit.

Because the communication on the I2C bus is completed even after the external RESET is asserted, the controller can resume the communication on the I2C bus securely.

Another aspect of the present application relates to a method to control an apparatus that includes a controller and a circuit unit coupled with the controller via the I2C bus. The method includes steps of, when the controller receives an external reset from an external system, (1) completing the communication between the controller and the circuit unit on the I2C bus, and (2) sending the internal RESET from the controller to the circuit unit to reset it. Because the controller first completes the communication on the I2C bus, it can resume the communication on the I2C bus securely even after the controller receives the external RESET independent of the status of the I2C bus.

BRIEF DESCRIPTION OF THE DRAWINGS

The invention will be described in conjunction with the accompanying drawings, in which:

FIGS. 2A and 2B show protocols adapted in the I2C communication;

DESCRIPTION OF PREFERRED EMBODIMENTS

Next, some embodiments according to the present invention will be described in detail. In the description of the drawings, the numerals or symbols same or similar to each other will refer to elements same or similar to each other without overlapping explanations.

Figure 1:
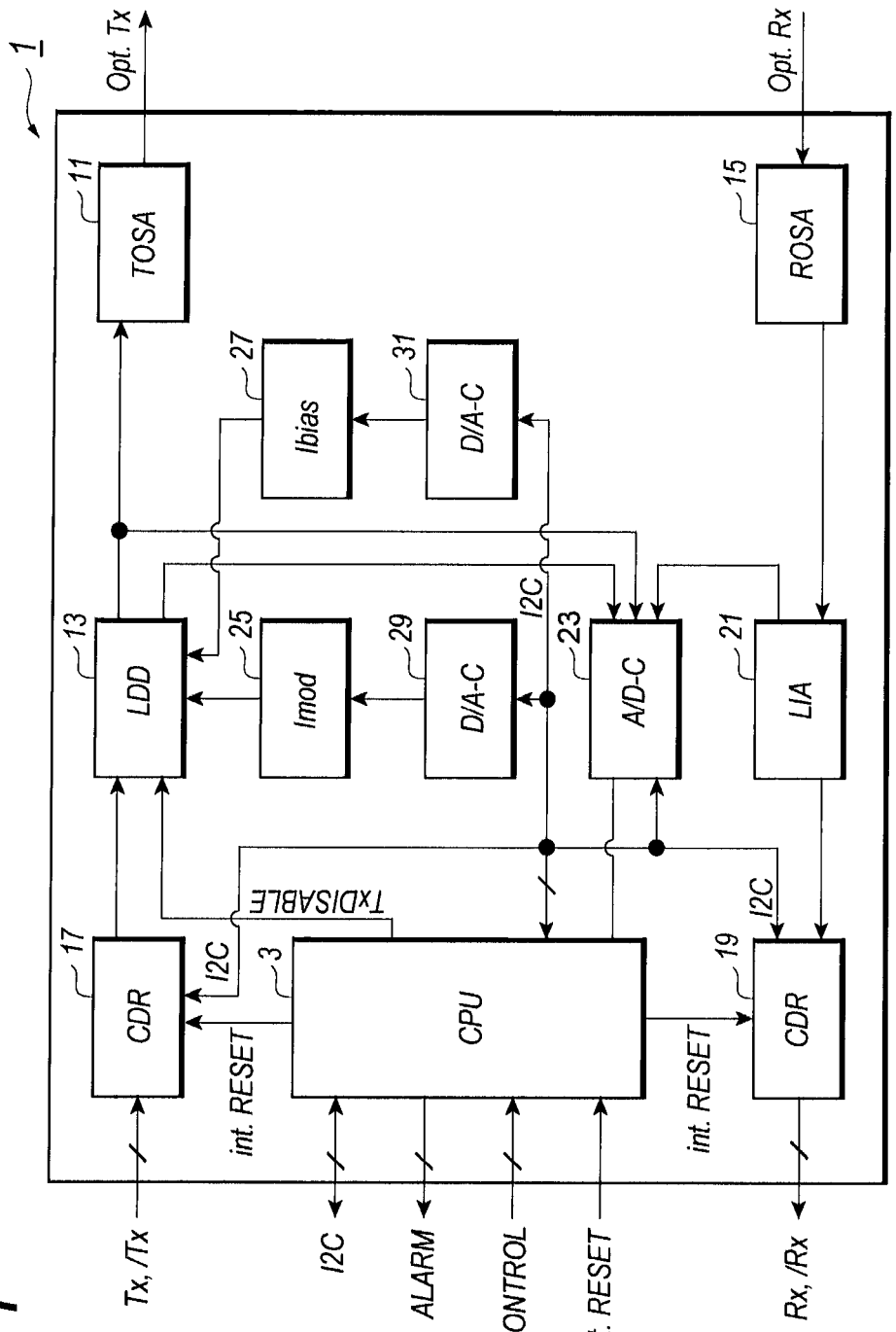
FIG. 1 shows a functional block diagram of an optical transceiver according to an embodiment of the invention.

FIG. 1 is a functional block diagram of an optical transceiver according to an embodiment of the invention. The optical transceiver 1 follows a multi-source agreement of, for instance, the XFP transceiver (X Form factor Pluggable, where "X" is a Roman numeral denoting 10 GHz). The optical transceiver 1, which converts signals between optical one and electrical one, includes a central processing unit (CPU) 3, a transmitter optical subassembly (TOSA) 11, an laser diode driver (LDD) 13, a receiver optical subassembly (ROSA) 15, clock data recoveries (CDRs), 17 and 19, a limiting amplifier (LIA) 21, an analog-to-digital converter (A/D-C) 23, a control unit 25 for a modulation current, another control unit 27 for a bias current, a digital-to-analog converter (D/A-C) 29 for the modulation current, and another D/A-C 31 for the bias current.

The CPU 3 is coupled with external devices, which is not illustrated in figures, via the I2C interface, ALARM lines, CONTROL lines, and a RESET. The ALARM lines and the CONTROL lines each include a plurality of statuses and commands, respectively. For instance, a status WARNING is sent from the CPU 3 when the optical transceiver falls in extraordinary conditions. The CONTROL includes a command to cut/activate an optical output of the optical transceiver 1, and/or another command to turn off the electronic power of the optical transceiver 1. The command to turn off the power disables the optical input and/or the optical output of the transceiver 1 to save the power consumption of the optical transceiver 1. Thus, the CPU 3, based on the commands sent externally, manages respective units within the optical transceiver 1. On the other hand, the CPU 3 also provides functions to monitor or diagnose respective units in the optical transceiver 1. Accordingly, the CPU 3 is a type of, what is called, one chip micro-controller. The CPU 3 also externally receives RESET to initialize the optical transceiver 1 and sends RESET to inner units such as two CDRS, 17 and 19.

The TOSA 11, which couples with the LDD 13 and the A/D-C 23, includes a laser diode (hereafter denoted as LD) to emit an optical signal that is provided externally based on the modulation current and the bias current, both of which are provided from the LDD 13.

The LDD 13, which is coupled with the CPU 3, the TOSA 11, the CDR 17, the A/D-C 23, and two control units, 25 and 27, for the modulation current and the bias current, respectively. The LDD 13, by receiving an analog signal for the modulation current from the control unit 25, adjusts the modulation current provided to the LD in the TOSA 11. Further, the LDD 13, by receiving another control signal for the bias current from the control unit 27, adjusts the bias current provided also to the LD in the TOSA 11. Furthermore, the LDD 13 receives Tx_DISABLE from the CPU 3 to turn off the optical output of the LD. The LDD 13 also receives an electrical modulation signal from the CDR 17, which is reshaped by the CDR 17, to generate the modulation current based on this modulation signal.

The control unit 25 for the modulation current is put between the LDD 13 and the D/A-C 29 to receive an analog signal generated by the D/A-C 29 to vary the magnitude of the modulation current generated in the LDD 13. The D/A-C 29 is put between the control unit 25 and the CPU 3 to receive a digital signal from the CPU 3 through the I2C bus to set the magnitude of the modulation current digitally. The D/A-C 29 converts thus received digital control signal into an analog signal and provides this analog signal to the control unit 25.

The other control unit 27 for the bias current, which is put between the LDD 13 and the D/A-C 31, receives an analog signal from the D/A-C 27 to determine the magnitude of the bias current generated in the LDD 13. The D/A-C 31 receives a digital control signal to determine the magnitude of the bias current from the CPU 3 through the I2C bus, and coverts this digital signal into the analog signal, and send this analog signal to the control unit 27.

The CDR 17 externally receives a pair of transmitting signals, Tx and /Tx, complementary to each other, where a slash "/" means that a signal with the slash has a phase opposite to a signal without the slash. The CDR 17 recovers a clock signal inherently contained in the signals, Tx and /Tx, and reshapes the signals, Tx and /Tx, by using thus recovered clock. The CDR 17 provides thus reshaped signals, Tx and /Tx, to the LDD 13. The CDR 17 can be reset by the CPU 3.

The other CDR 19, which is coupled with the LIA 21 and the CPU 3, receives an electrical signal from the LIA 21 that reflects an optical signal input to the optical transceiver 1, reshapes this electrical signal, generates electrical signals, Rx and /Rx, complementary to each other from thus reshaped electrical signal, and externally outputs thus generated electrical signals, Rx and /Rx.

Two CDRs, 17 and 19, are coupled with the CPU 3 through the I2C bus. The CPU 3 controls two CDRs, 17 and 19, by commands sent through the I2C bus, and acquires statuses within the CDRs, 17 and 19, through the I2C bus.

The ROSA 15 provides a light-receiving-device, typically, a semiconductor photodiode (hereafter denoted as PD), to convert the input optical signal into an electrical signal, and provides thus converted electrical signal to the LIA 21. The LIA 21 receives the electrical signal, which is converted from the input optical signal by the PD in the ROSA 15, to amplify this electrical signal, and to provide this amplified signal to the CDR 19. The LIA 21 provides a monitored signal, which reflects the magnitude of the input optical signal, to the A/D-C 23.

The A/D-C 23 regularly receives monitored signal of, for instance, TxBIAS, TxPOWER, RxPOWER, and so on from the LDD 13 and the LIA 21, converts these monitored signal into corresponding digital signals, and provides thus converted monitored signals to the CPU 3 through the I2C bus.

In the optical transceiver 1, the CPU 3 is coupled with the CDRs, 17 and 19, the A/D-C 23, and the D/A-Cs, 29 and 31, through the I2C bus. An I2C bus can generally take various formats for the DATA READ and DATA WRITE, as shown in FIGS. 2A and 2B, where FIG. 2A corresponds to PAGE WRITE as defining the device address and subsequent data frames whose addresses are sequentially determined from the device address; while, FIG. 2B is RANDOM READ as defining the device address and subsequent data are alternately defined.

Figure 3A:
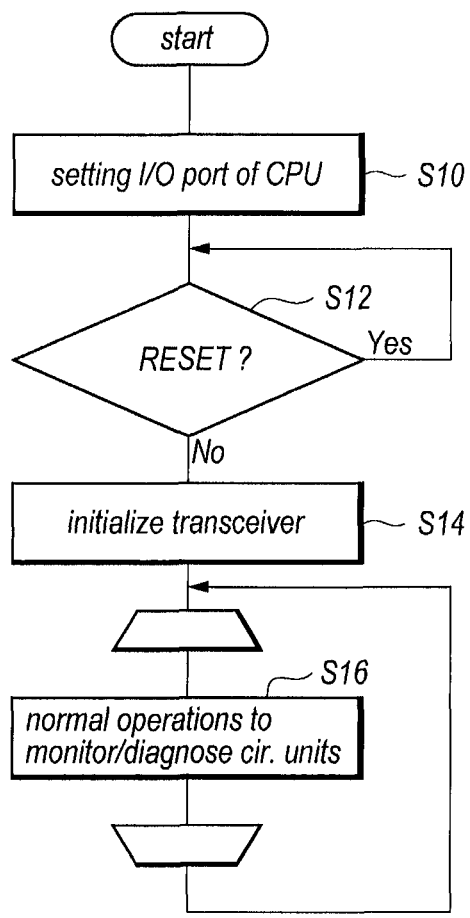
FIG. 3A is a flow chart to start the optical transceiver.
Figure 3B:
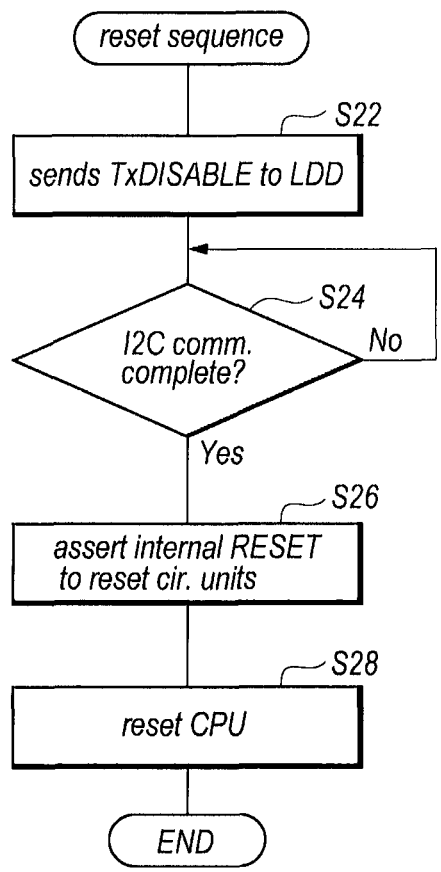
FIG. 3B is a flow chart of the reset sequence when the controller receives the external RESET.
Figure 4:
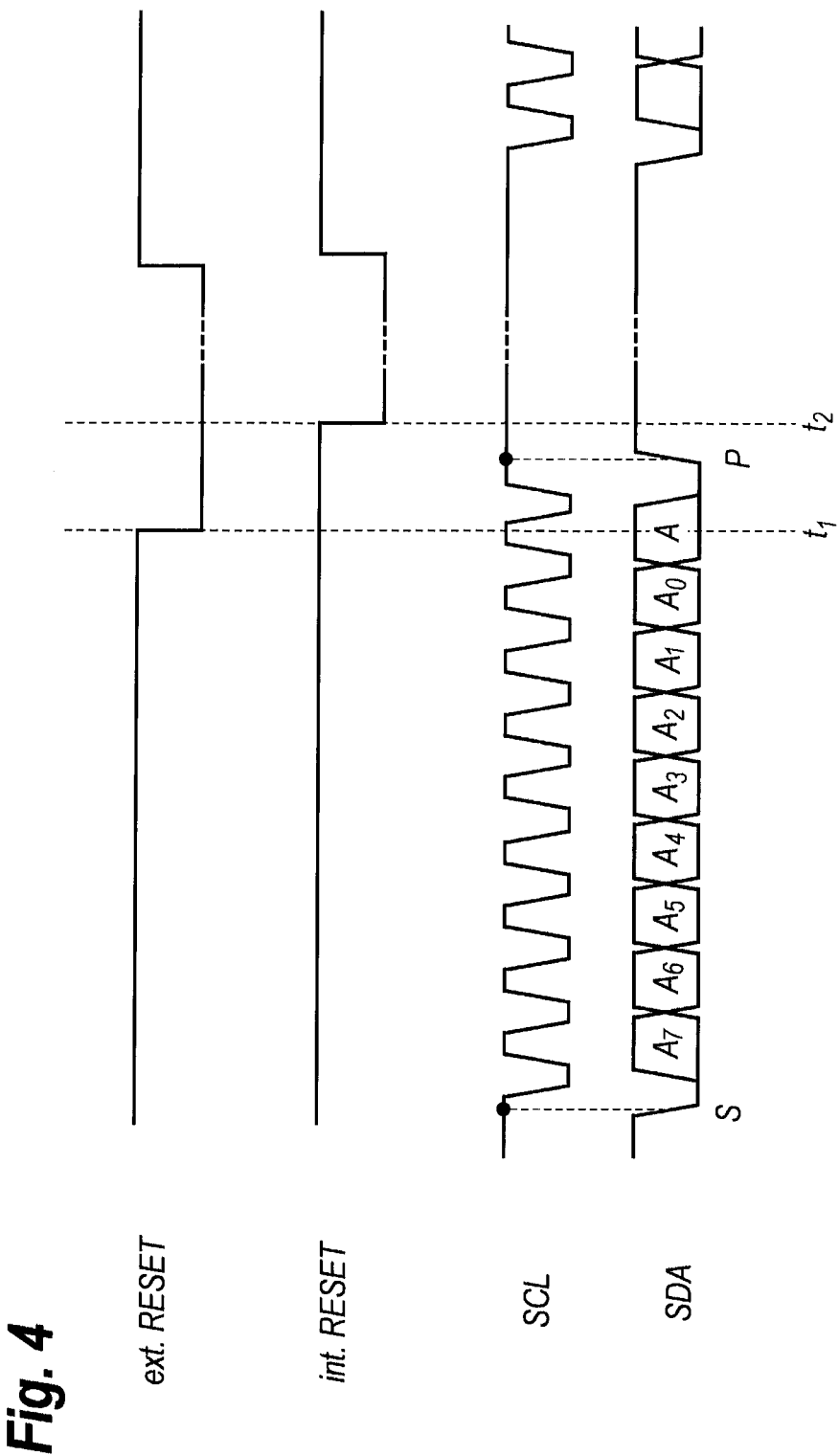
FIG. 4 show time charts of the external RESET, internal RESET, and two lines, SCL and SDA, of the I2C bus when the external RESET is asserted.

FIG. 3 is a flow chart showing the operation of the optical transceiver 1, while, FIG. 4 shows a time chart of the reset sequence of the optical transceiver 1. Next, the reset sequence will be described as comparing normal operations after the starting of the optical transceiver 1. FIG. 3A is the flow chart describing the normal operation after starting; while, FIG. 3B shows the reset sequence. FIG. 4A is RESET received by the CPU 3, FIG. 4B is another RESET provided to the CDR 17 from the CPU 3, and FIGS. 4C and 4D each show SCL and SDA, respectively, of the I2C bus. The RESET sequence and the normal operation each shown in FIGS. 3A and 3B are controlled by the CPU 3 through data carried on SDA of the I2C bus. The explanation below will concentrate on the control of the CDR 17 in the reset sequence and the normal operation.

Referring to FIG. 3A first, in the normal operation of the optical transceiver 1 after the starting thereof, the CPU 3 first sets the input/output port at step S10; then checks whether external RESET is asserted or not at step S12. When RESET is negated, the CPU 3 advances a step to initialize the optical transceiver 1 at step S14, then iterate normal procedures, such as monitoring and/or detecting statuses, and diagnosing circuit units in the optical transceiver 1 at step S16. On the other hand, when RESET is detected at step S12 or during sequences of the normal procedures as an interruption, the reset sequence shown in FIG. 3B begins.

A reset sequence will be described as referring to FIG. 3B and FIG. 4. When the CPU 3 receives the external RESET at a time t1 in FIG. 4, the CPU first sends TxDISABLE directly to the LDD 13 without through the I2C bus to turn off the optical output from the TOSA 11.

Subsequently, the CPU 3 checks whether the communication with internal devices coupled with CPU 3 via the I2C bus, such as the CDR 17, is completed or not. Specifically, the I2C bus sets the stop condition "P" in FIGS. 2A and 2B by converting SDA from LOW to HIGH as holding SCL in HIGH. The circuit units coupled with the CPU 3 via the I2C bus, responding the stop condition, finally sets SDA in HIGH after the operation by the circuit units completes. The CPU 3 can detect the completion of the communication on the I2C bus by detecting a status of both of SDA and SCL in HIGH. When the communication on the I2C bus is incomplete, the CPU 3 iterates step S24 until both SDA and SCL become HIGH.

When the CPU 3 decides at step S24 that the communication on the I2C bus is completed, the CPU 3 sends the internal RESET to the internal device coupled via the I2C bus, for instance, the CDR 17, at the time t2 in FIG. 4B to reset the internal device. Then, the CPU 3 starts the reset sequence itself. Thus the reset sequence of the transceiver 1 is completed.

Figure 5:
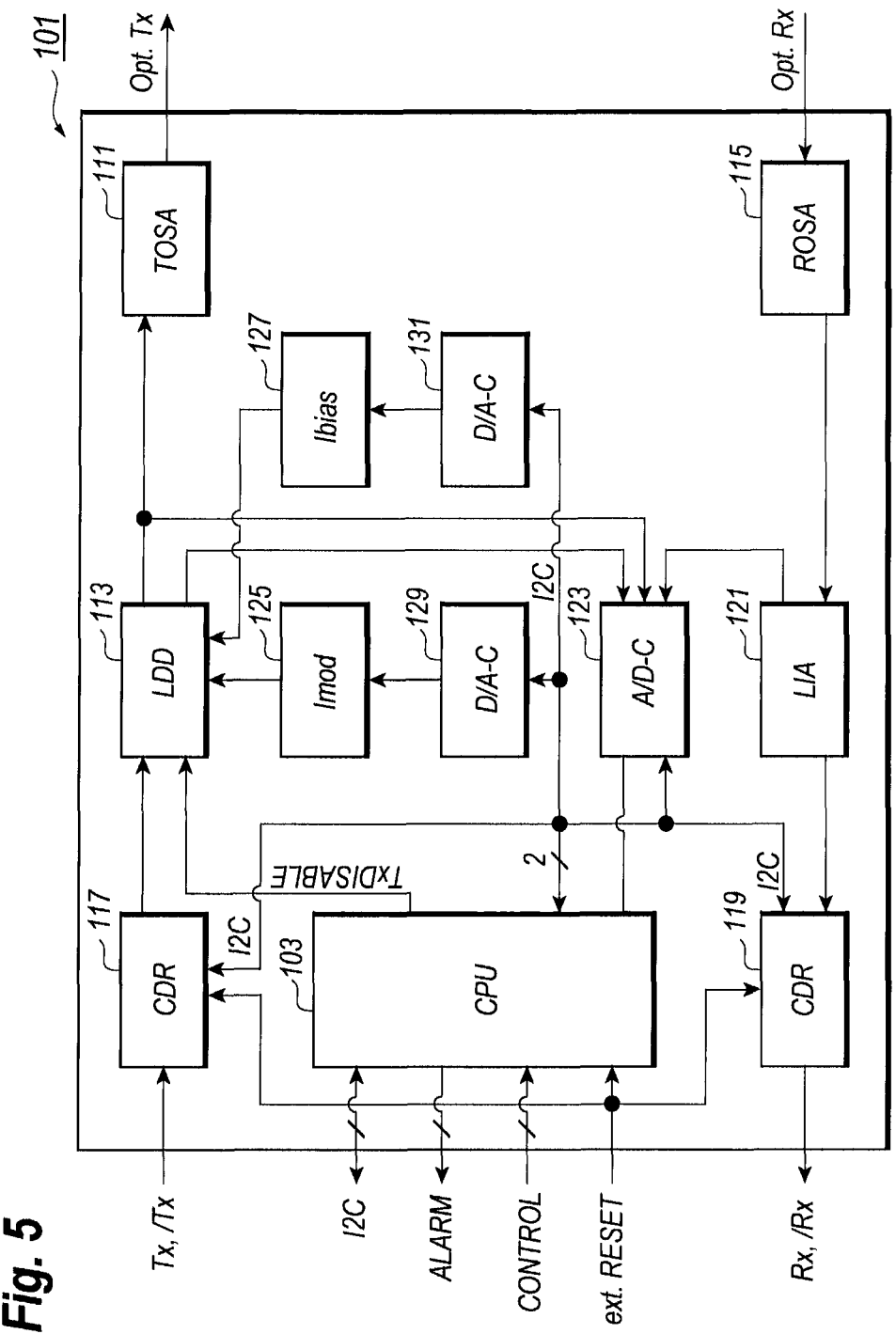
FIG. 5 shows a functional block diagram of a comparable optical transceiver where some internal circuit units receive the external RESET directly from the external device.

A comparable optical transceiver 101, whose functional block diagram is shown in FIG. 5, is compared with the optical transceiver 1 according to the present invention. The comparable optical transceiver 101 has an arrangement distinguishable from the arrangement of the present optical module 1 shown in FIG. 1 that RESET is externally provided to the internal circuit units, for instance, the CDRs, 117 and 119, where they communicate with the CPU 103 via the I2C bus. On the other hand, the CDRs, 17 and 19, of the embodiment receive RESET internally from the CPU 3.

In the comparable arrangement shown in FIG. 5, when the CPU 103 receives external RESET during the communication with the CDRs, 117 and 119, via the I2C bus, the CPU 103 is occasionally reset as SDA of the I2C bus is set in LOW.

Figure 6:
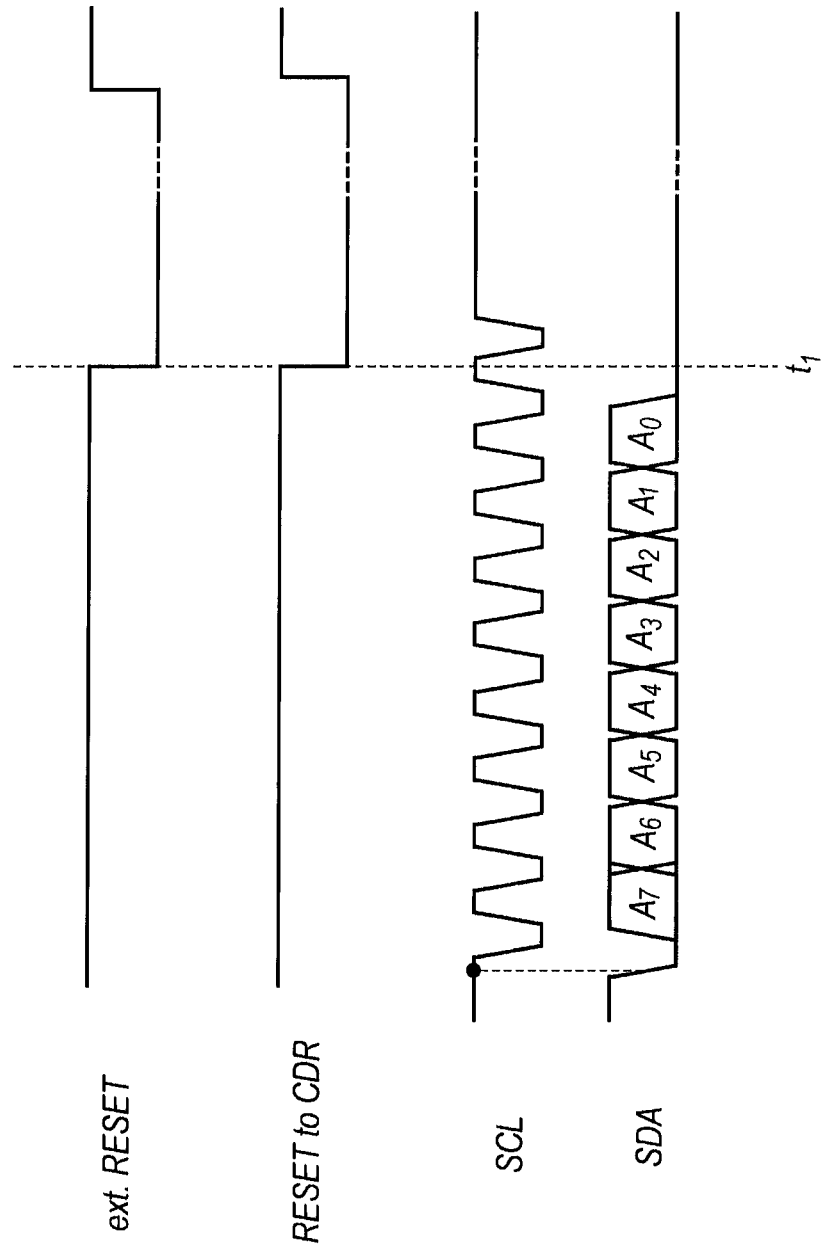
FIG. 6 show time charts of the external RESET, RESET provided to the CDR, and two lines, SCL and SDA, of the I2C bus according to an arrangement comparable to the present invention.

In such an event, SDA is stayed LOW even after external RESET is negated as shown in FIG. 6. Upper two time charts in FIG. 6 correspond to RESET externally provided to the CPU 103 and the CDRs, 117 and 119, respectively. According to the standard of the I2C bus, the I2C bus is necessary in both SCL and SDA to be set in HIGH by the CPU 103, which is regarded as the master device in the I2C bus, to start the communication on the bus. When SDA is stayed in LOW even after the external RESET is negated as shown in FIG. 6, the CPU 103 cannot resume the start condition on the I2C bus.

In the optical transceiver 1 according to an embodiment shown in FIG. 1, the CPU 3 first sets both SCL and SDA in HIGH when it receives external RESET to resume the start condition, and resets itself after the communication with the CDRs, 17 and 19, via the I2C bus completes. Accordingly, as shown in FIG. 4, the condition where SDA is stayed in LOW even after the external RESET is negated because the CPU 3 resets itself after the communication on the I2C bus completes, which enables the CPU 3 to resume the start condition. In the aforementioned descriptions, two CDRs, 17 and 19, are exemplarily explained as a device with functions to receive the internal RESET and to communicate with the CPU 3 via the I2C bus. However, the reset sequences above described is applicable to other devices that receive the internal RESET and couple with the CPU 3 via the I2C bus.

What is claimed is:

1. A method to control an apparatus that provides a controller and a circuit unit coupled with the controller via an inter integrated circuit (I2C) bus and an optical unit configured to emit an optical signal, the method in the following order comprising steps of:

receiving an external RESET by the controller externally;

setting the optical unit as inactive;

completing communication between the controller and the circuit unit on the I2C bus;

turning off the optical unit; and providing an internal RESET from the controller to the circuit unit to reset the circuit unit.

2. The method of claim 1, further including a step of, after providing the internal RESET to the circuit unit, resetting the controller.

3. A method to control an apparatus that provides a controller, a circuit unit coupled with the controller via an inter integrated circuit (I2C) bus and an optical unit to emit an optical signal, the method in the following order comprising steps of:

receiving an external RESET by the controller externally;

setting the optical unit inactive;

completing communication between the controller and the circuit unit on the I2C bus;

providing an internal RESET from the controller to the circuit unit to reset the circuit unit; and turning off the optical unit.

\* \* \* \* \*